United States Patent [19]

Schneider et al.

[11] Patent Number: 5,477,023
[45] Date of Patent: Dec. 19, 1995

[54] LASER ENGRAVING SYSTEM AND METHOD FOR ENGRAVING AN IMAGE ON A WORKPIECE

[75] Inventors: Urban A. Schneider; John P. Mortara; Alfred C. Owens; Douglas L. Mann; Micki M. Baumert, all of Pensacola; Robert D. Sigman, Orlando, all of Fla.

[73] Assignee: Westinghouse Electric Corporation, Pittsburgh, Pa.

[21] Appl. No.: 53,119

[22] Filed: Apr. 23, 1993

[51] Int. Cl.⁶ .................................................. B23K 26/00
[52] U.S. Cl. .......................... 219/121.68; 219/121.11; 219/121.69; 372/10; 358/299; 364/474.08
[58] Field of Search .......................... 219/121.6, 121.65, 219/121.66, 121.68, 121.69, 121.11, 121.67; 378/65, 145; 372/92, 9, 10, 25, 103; 358/299; 364/474.08

[56] References Cited

U.S. PATENT DOCUMENTS

| | | | |
|---|---|---|---|
| 3,636,251 | 1/1972 | Daly et al. | 219/121.65 |
| 3,657,510 | 4/1972 | Rothrock | 219/121.65 |
| 4,079,701 | 3/1978 | Hickman et al. | 122/382 |
| 4,354,196 | 10/1982 | Neumann et al. | 346/108 |
| 4,467,172 | 8/1984 | Ehrenwald et al. | 219/121.65 |
| 4,507,789 | 3/1985 | Daly et al. | 372/92 |
| 4,564,739 | 1/1986 | Mattelin | 219/121.65 |
| 4,710,330 | 12/1987 | Lewandowski et al. | 264/25 |
| 4,727,235 | 2/1988 | Stamer et al. | 219/121.6 |
| 4,756,878 | 7/1988 | King et al. | 219/121.66 |
| 4,803,336 | 2/1989 | Myer | 219/121.68 |
| 4,822,987 | 4/1989 | Goldenfield et al. | 235/462 |
| 4,874,919 | 10/1989 | Bransden et al. | 219/121.68 |
| 4,970,600 | 11/1990 | Garnier et al. | 358/299 |
| 4,985,780 | 1/1991 | Garnier et al. | 219/121.68 |
| 5,014,290 | 5/1991 | Moore et al. | 378/145 |
| 5,206,496 | 4/1993 | Clement et al. | 219/121.6 |
| 5,262,613 | 11/1993 | Norris et al. | 219/121.68 |

FOREIGN PATENT DOCUMENTS

| | | |
|---|---|---|
| 0080651 | 11/1982 | European Pat. Off. . |
| 0154279 | 2/1985 | European Pat. Off. . |
| 2670922 | 12/1991 | France . |

OTHER PUBLICATIONS

Photocopy of commercial advertisement illustrating the Ray Marker apparatus available from International Laser Machines Corporation (no date provided on publication).

*Primary Examiner*—Tu Hoang
*Attorney, Agent, or Firm*—Walter S. Stevens

[57] ABSTRACT

System and method for engraving an image on a workpiece, such as a nuclear steam generator tubesheet. The system includes a laser assembly for generating a pulsed laser beam to engrave the image adjacent a target position on the workpiece. A positioning mechanism is connected to the laser assembly for positioning the laser assembly with reference to the target position. A controller is electrically connected to the positioning mechanism for controlling the positioning mechanism in order to controllably position the laser assembly at the target position and for verifying the image engraved at the target position. A computer is electrically connected to the controller for receiving the verified image. The computer is also electrically connected to the laser assembly for operating the laser assembly so that the laser beam emitted thereby engraves the image on the tubesheet at the target position.

20 Claims, 9 Drawing Sheets

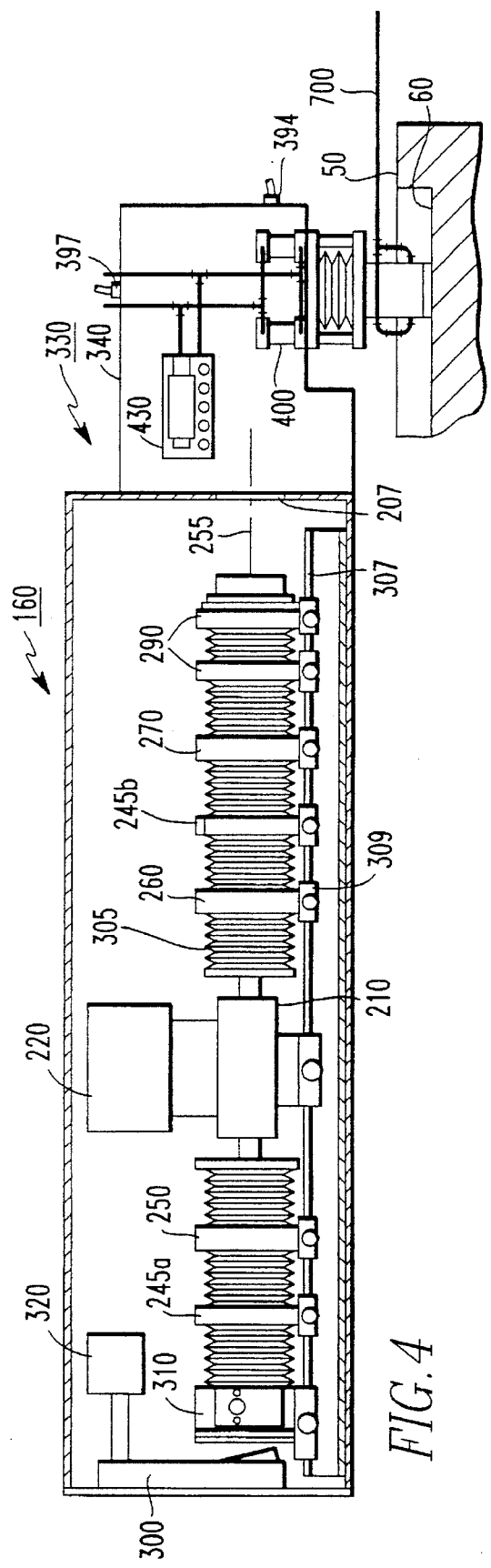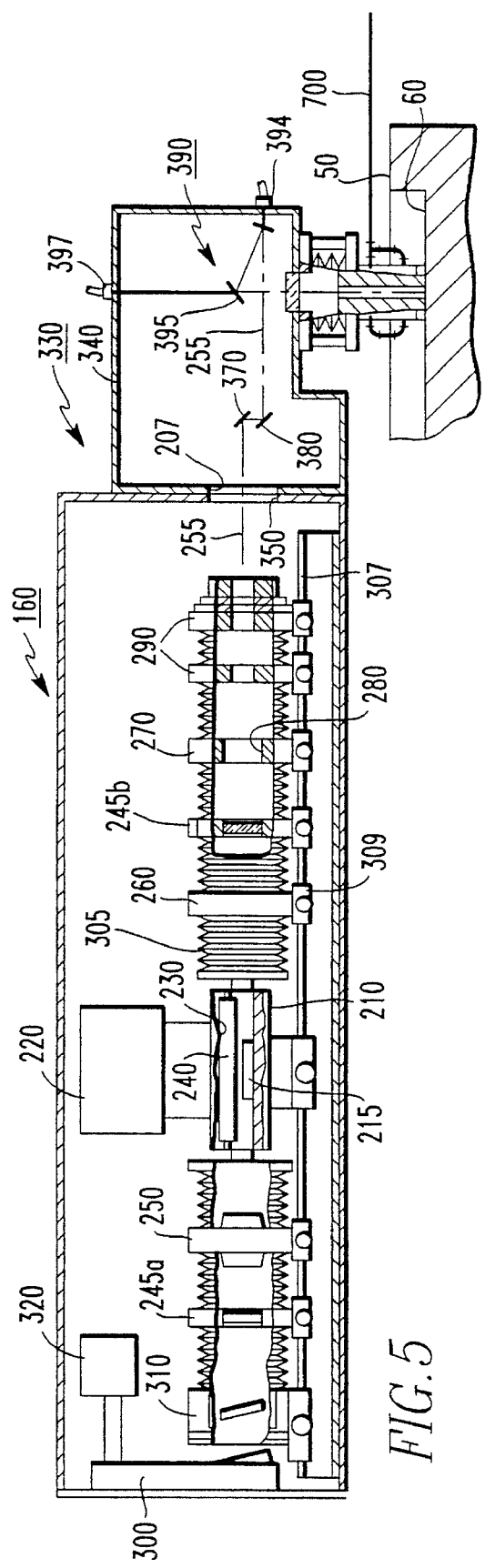

LASER ENGRAVING SYSTEM AND METHOD FOR ENGRAVING AN IMAGE ON A WORKPIECE

This invention generally relates to engraving apparatus and methods and more particularly relates to a laser engraving system and method for engraving an image on a workpiece, such as a nuclear steam generator tubesheet.

Although laser engraving apparatus and methods are known in the prior art, it has been observed that these prior art devices and methods have certain operational problems associated with them which make these apparatus and methods unsuitable for engraving images on tubesheets of the kind typically found in nuclear steam generators. However, before these problems can be appreciated, some background is necessary as to the structure and operation of a typical nuclear steam generator and its associated tubesheet.

In this regard, a nuclear steam generator is a device for producing steam by circulation of a pressurized and radioactive first fluid, referred to as the primary fluid, through a plurality of tubes that are surrounded by a nonradioactive second fluid of lower temperature, referred to as the secondary fluid. The tubes have an inverted U-shape, the opposite ends of which pass through openings in a tubesheet disposed in the steam generator. The tube ends, which are welded to the tubesheet to support the tubes, are in fluid communication with a manifold defined by the steam generator, the manifold being divided by means of a divider plate into an inlet chamber and an outlet chamber. The inlet and outlet chambers are in communication with the primary fluid by means of an inlet nozzle and an outlet nozzle, respectively, for circulating the primary fluid through the tubes. The secondary fluid, which surrounds the tubes, is vaporized into steam as the heat of the circulating primary fluid is conducted through the walls of the tubes to the secondary fluid. The steam flows to a turbine-generator for providing revenue-producing electricity in a manner well known in the art of power generation.

The primary fluid, however, may contain suspended particles such as metal oxides and scale-forming calcium. These particles may form deposits that cover portions of the tubes to provide sites for concentration of corrosive impurities that attack the tubes to degrade the tubes. Such degradation may cause the tubes to develop through-wall cracks that allow the pressurized and radioactive primary fluid to leak through the cracks and commingle with the nonradioactive secondary fluid. Leaking tubes are undesirable from a safety standpoint because commingling the radioactive primary fluid with the nonradioactive secondary fluid radioactively contaminates the secondary fluid which in turn may lead to radioactive contamination of the turbine-generator and its surrounding environment. In addition, leaking tubes are undesirable from a economic standpoint because the steam generator must be removed from service to plug or sleeve the leaking tubes in order to stop the leaks. Removing a steam generator from service results in approximately $500,000 per day in lost revenue.

Although such tube leaks may be caused by deposit formation as previously mentioned, such leaks also may be caused by "out-of-spec" materials and manufacturing techniques used to make the tubes. Therefore, it is desirable to uniquely identify each steam generator tube for tracing the materials and methods used in manufacturing the tube. This traceability is useful in identifying any "out-of-spec" materials and manufacturing techniques that may have contributed to the leaks. To this end, each tube is identified by clearly visible symbologie marked on the tubesheet adjacent the tube ends, so that each tube obtains a unique identifier for purposes of traceability. The unique symbologie are selected so as to provide a one-to-one correspondence between each tube and the particular materials and manufacturing methods used to make the tube. Hence, if a specific tube material or manufacturing method is linked to a leaking tube, the tube material or manufacturing method is modified so that future leaks are avoided.

In one prior art method of marking the symbologie on the tubesheet to identify the tubes, the symbologie are manually impression stamped onto the face of the tubesheet adjacent their associated tube ends. However, present day nuclear steam generator designs typically have a densely-packed tube array comprising thousands of tubes that permit only a limited amount of available space between adjacent tubes. The prior art apparatus used to perform the impression stamping produces symbologie that are too large to fit side-by-side between such closely-spaced tubes. Therefore, the required symbologie are stamped adjacent every other tube. However, stamping every other tube increases the probability of erroneously identifying tubes not having symbologie. This is so because the symbologie of the identified tubes are used to calculate or interpolate the identity of the tube residing therebetween not having symbologie. Use of this interpolation process occasionally misidentifies the tube not having symbologie. For example, such a misidentification error will occur if the alphanumeric characters comprising the symbologie of the identified tubes are inadvertently transposed and then used to erroneously calculate or interpolate the identity of the tube residing therebetween not having symbologie. Any errors of this type must be found and corrected, thereby increasing costs associated with tracing the materials and manufacturing methods used to make the tube. Therefore, a problem in the art is to provide an error-free means for identifying each steam generator tube, rather than every other tube, to avoid the need for interpolation.

Moreover, due to the inherent nature of manually impression stamping symbologie on the tubesheet, some of the alphanumeric characters comprising the symbologie may not be readily or accurately readable. In other words, insufficient stamping force applied to the tubesheet during the manual impression stamping process may cause some of the stamped characters to be too faint for accurate readability. This also gives rise to errors leading to misidentification of tubes. Therefore, another problem in the art is to provide means for marking symbologie on the tubesheet to obtain visually discernable characters that are readily and accurately readable.

Furthermore, in the above mentioned prior art method of applying symbologie to the tubesheet, the symbologie are manually impression stamped or struck on the tubesheet after the tubes are welded to the tubesheet. Occasionally, however, a misstrike may occur such that a tube weld is damaged. Damage to the tube weld may compromise the ability of the tube end to remain affixed to the tubesheet. Therefore, still another problem in the art is to provide means for marking symbologie on the tubesheet such that the tube welds are not damaged.

In addition, the transverse contour or profile of the impression struck in the tubesheet must meet certain metallurgical and geometrical criteria required for service in the corrosive environment of the nuclear steam generator. That is, the marking process should not work harden the tubesheet material because such work hardening may increase the potential for stress corrosion cracking of the tubesheet material when the steam generator is placed in service and subjected to the corrosive effects of the primary fluid. Such stress corrosion cracking is undesirable for safety reasons. Moreover, the transverse contour or profile of the symbologie stamped into the tubesheet must be particle-free so as not to contribute to the inventory of corrosive particles in the primary fluid, which corrosive particles may lead to corrosion. In addition, the transverse contour or profile of the depth of the symbologie stamped into the tubesheet must be smooth enough not to interfere With liquid dye penetrant examination, which is used to detect cracks in the tubesheet. Therefore, yet another problem in the art is to provide a system and method of marking symbologie on the tubesheet in a manner such that the marking process does not work harden the tubesheet material and does not contribute to the inventory of corrosive particles in the primary fluid or interfere with liquid dye penetrant examination.

An alternative to impression stamping a workpiece is to laser mark the workpiece by operation of a laser. However, to be suitable for marking nuclear steam generator tubesheets, such a laser marking technique should not necessitate substantial interpolation to identify tubes, not damage tube welds, not work harden the tubesheet material, and not contribute to the inventory of corrosive particles or interfere with dye penetrant examination, as it simultaneously produces symbologie that are accurately readable.

Laser marking methods and apparatus are known. A method and apparatus for laser marking fuel rods is disclosed in U.S. Pat. No. 4,822,987 titled "Method And Apparatus For Providing Fuel Rod Identification To Permit Traceability During Manufacture And Use" issued Apr. 18, 1989 to Mark P. Goldenfield, et al. and assigned to the assignee of the present invention. This patent generally relates to identification and traceability, and more particularly relates to a method and apparatus for providing nuclear fuel identification to permit individual fuel rod traceability during manufacture and use. This patent discloses a laser marking workstation that applies a bar code and symbologie to the fuel rod. According to this patent, a laser beam produced and guided by the workstation is applied to a cladding tube of a fuel rod. A computer controls a laser to etch digits of a serial number on the fuel rod. Although the Goldenfield, et al. patent discloses a laser marking workstation that applies a bar code and symbologie to a fuel rod, this patent does not appear to disclose a laser engraving system and method suitable for engraving an image on a workpiece, such as a nuclear steam generator tubesheet, as described and claimed hereinbelow.

Another device and method for laser marking is disclosed in U.S. Pat. No. 4,970,600 titled "Laser Engraver With X-Y Assembly And Cut Control" issued Nov. 13, 1990 to Steven F. Garnier, et al. This patent discloses a laser engraver that includes a laser for providing a laser beam that can be used to engrave a workpiece. The laser engraver further includes an input device for providing pattern data to a computer, which input device also provides permanent storage for the data. The data comprises one or more sets of two-dimensional coordinate information that specify the movements of the laser beam. The computer controls an X-Y device that moves the laser beam according to the pattern data provided by the input device and information provided by a user on a user interface. A cut control device controls the depth of the cut made by the laser beam during the movements specified by the pattern data. Although the Garnier, et al. patent discloses a laser engraver that includes a laser for providing a laser beam that can be used to engrave a workpiece, this patent does not appear to disclose a laser engraving system and method suitable for engraving an image on a workpiece, such as a nuclear steam generator tubesheet, as described and claimed hereinbelow.

Therefore, what is needed is a laser engraving system and method for engraving an image on a workpiece, such as a nuclear steam generator tubesheet.

SUMMARY

Disclosed herein is a system and method for engraving an image on a workpiece, such as a nuclear steam generator tubesheet. The system includes a laser assembly for generating a pulsed laser beam to engrave the image at a target position on the workpiece. A positioning mechanism is connected to the laser assembly for positioning the laser assembly with reference to the target position. A controller is electrically connected to the positioning mechanism for controlling the positioning mechanism in order to controllably position the laser assembly at the target position and for verifying the image to be engraved at the target position. A computer is electrically connected to the controller for specifying the target position. The computer is also electrically connected to the laser assembly for operating the laser assembly so that the laser beam emitted thereby engraves the verified image on the tubesheet at the specified target position.

In its broad form, the invention is a laser engraving system for engraving an image on a workpiece, comprising laser means for emitting a beam of light onto the workpiece; positioning means connected to said laser means for positioning said laser means with reference to the workpiece; control means connected to said positioning means for controlling said positioning means so that said laser means is controllably positioned thereby with reference to the workpiece; and computer means connected to said control means for specifying when said laser means is positioned with reference to the workpiece and connected to said laser means for operating said laser means to engrave the image on the workpiece.

In its broad form, the invention is also a laser engraving method for engraving an image on a workpiece, comprising the steps of operating a positioning mechanism connected to a laser assembly for positioning the laser assembly adjacent the workpiece, the laser assembly connected to a computer; controlling said operation of the positioning mechanism by operating a controller connected to the positioning mechanism; and emitting the beam of light from the laser assembly by operating the computer connected to the laser assembly, so that the beam of light engraves the workpiece.

An object of the present invention is to provide a laser engraving system and method for engraving an image on a workpiece, such as a nuclear steam generator tubesheet.

Another object of the present invention is to provide a laser engraving system and method for obtaining traceability of each steam generator tube, so that the materials and manufacturing process used to fabricate the tube are discernable.

Still another object of the present invention is to provide an error-free system and method for identifying steam generator tubes so as to avoid the need for interpolation of tube identifiers.

Yet another object of the present invention is to provide a system and method of applying symbologie to the tubesheet so that the symbologie are accurately readable.

An additional object of the present invention is to provide a system and method of applying symbologie to the tubesheet such that tube welds are not damaged.

A further object of the present invention is to provide a system and method of engraving symbologie on the tubesheet in a manner such that the engraving process does not work harden the tubesheet material or contribute to the inventory of corrosive particles in the primary fluid or interfere with liquid dye penetrant examination.

A feature of the present invention is the provision of a laser to engrave symbologie on the tubesheet.

Another feature of the present invention is the provision of a positioning mechanism connected to the laser for positioning the laser at a plurality of target positions associated with respective ones of .a plurality of tube hole locations on the tubesheet and a controller connected to the positioning mechanism for controlling the positioning mechanism.

Still another feature of the present invention is the provision of a computer connected to the controller for specifying the location of each target position and connected to the laser for operating the laser, so that the laser is operated to automatically engrave symbologie at each target position on the tubesheet after being positioned at each target position by the positioning mechanism.

Yet another feature of the present invention is the provision of a vacuum assembly for vacuuming extraneous particles produced by the lasing process at the target positions, so that the profile of any engraved symbologie is particle-free and so that any air-borne particulates are kept out of the laser beam path.

An advantage of the present invention is that a one-to one correspondence is provided between each tube and the particular materials and manufacturing methods used to fabricate the tube in order to provide traceability.

Another advantage of the present invention is that interpolation of tube identifiers is unnecessary so that misidentification of tubes is avoided.

Still another advantage of the present invention is that each tube is identified by clearly visible symbologie engraved on the tubesheet, so that the symbologie are accurately readable to avoid errors in identifying tubes.

Yet another advantage of the present invention is that the engraved symbologie is particle-free to reduce the inventory of corrosive particles in the primary fluid of the steam generator.

These and other objects, features, and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

FIG. 4 is a view in elevation of the laser assembly;

FIG. 5 is a view in partial elevation of the laser assembly;

DESCRIPTION OF THE PREFERRED EMBODIMENTS(S)

Occasionally, nuclear steam generator tubes that extend through a tubesheet develop leaks that allow the radioactive primary fluid to radioactively contaminate the nonradioactive secondary fluid. Such tube leaks may be caused by "out-of-spec" manufacturing techniques. Therefore, it is desirable to uniquely identify the tubes by means of symbologie engraved on the tubesheet adjacent the tube ends for tracing the materials and methods used in manufacturing the tube. In addition, such tubes leaks may be caused by suspended particles in the primary fluid, which particles may form deposits that cover portions of the tubes to provide sites for concentration of corrosive impurities that attack the tubes to degrade the tubes. Hence, it is also desirable that any symbologie engraved on the tubesheet be particle-free to reduce the inventory of particles suspended in the primary fluid of the steam generator. Therefore, disclosed herein is a laser engraving system and method for engraving an image on a workpiece, such as a nuclear steam generator tubesheet, so that the materials and manufacturing techniques used to make the tubes are traceable and so that the engraved symbologie are particle-free.

However, before describing the subject matter of the present invention, it is instructive first to briefly describe the structure and operation of a typical nuclear steam generator, which contains the tubesheet for supporting the plurality of steam generator tubes.

Figure 1:
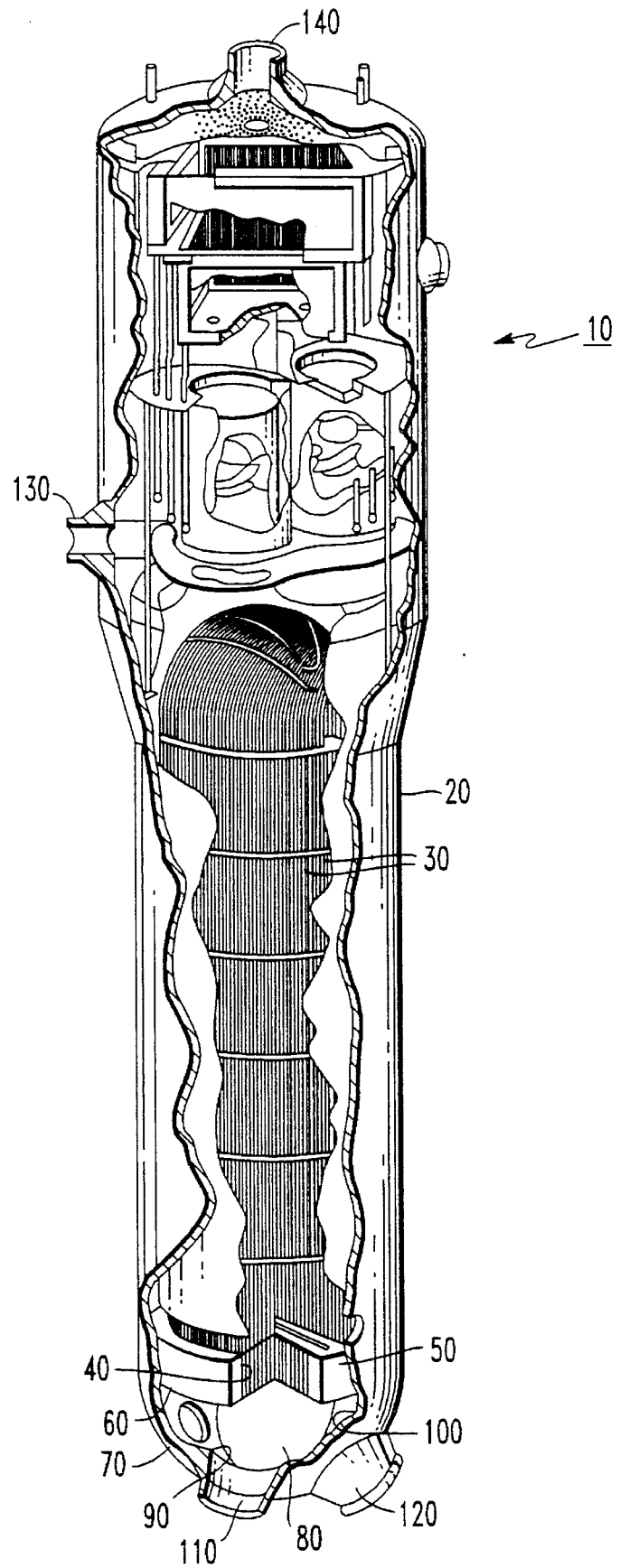
FIG. 1 shows in partial vertical section a nuclear steam generator with parts removed for clarity, the steam generator having a tubesheet disposed therein for supporting a plurality of heat transfer tubes.

Therefore, referring to FIG. 1, there is shown a typical nuclear steam generator, generally referred to as 10, for generating steam. Steam generator 10 comprises a vertically oriented shell 20 having a plurality of inverted U-shaped steam generator tubes 30 disposed therein. The ends of each tube 30 pass through respective openings 40 formed through a tubesheet 50 disposed transversely inwardly of shell 20. The ends of each tube 30 are welded, such as by weldments 55 (see FIG. 10), to tubesheet 50 to support each tube 30. As shown in FIG. 1, tubesheet 50 has an underside surface 60 to which is welded each tube end to support each tube 30 in tubesheet 50. Tubesheet 50 and tubes 30 may be "INCONEL 600" or the like, comprising by weight percent approximately 76.0% nickel, 0.08% carbon, 0.05% manganese, 8.3% iron, 0.008% sulfur, 0.025% copper, and 15.5% chromium. Moreover, each tube end is in fluid communication with a manifold 70 defined by steam generator 10. Manifold 70 is divided by means of a vertically oriented divider plate 80 into an inlet chamber 90 and an outlet chamber 100, for reasons disclosed presently. Inlet chamber 90 and outlet chamber 100 are in fluid communication with a pressurized (e.g., approximately 2200 psia) and radioactive primary fluid (not shown) by means of an inlet nozzle 110 and an outlet nozzle 120, respectively, for circulating the primary fluid through tubes 30. The primary fluid itself is in fluid communication with a nuclear heat source (not shown) for heating the primary fluid. Nonradioactive secondary fluid (not shown) having a temperature lower than the primary fluid enters shell 20 through a feedwater nozzle 130 connected to shell 20. The secondary fluid is caused to flow through feedwater nozzle 130 and into shell 20 to eventually surround tubes 30. As the heated primary fluid circulates through tubes 30, it gives up its heat to the secondary fluid surrounding tubes 30 so that the secondary fluid is vaporized into steam as the heat of the primary fluid is conducted to the secondary fluid through the walls of tubes 30. This steam exits shell 20 through a steam nozzle 140 connected to shell 20 and flows to a turbine-generator (not shown) for providing revenue-producing electricity in a manner well known in the art of power generation. Such a typical nuclear steam generator is more fully disclosed in commonly owned U.S. Pat. No. 4,079,701 titled "Steam Generator Sludge Removal System" issued Mar. 21, 1978 in the name of Robert A. Hickman, et al., the disclosure of which is hereby incorporated by reference.

Figure 2:
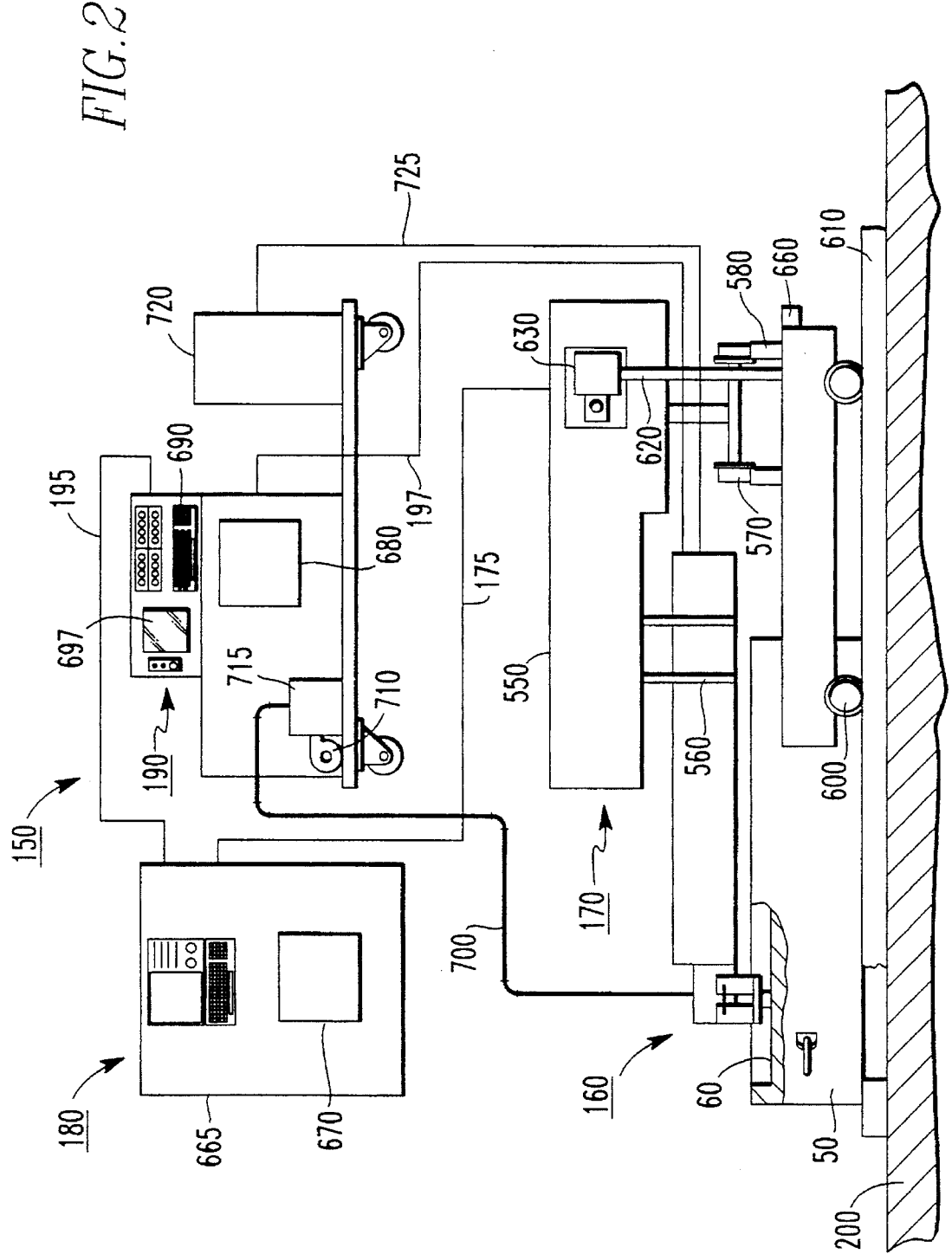
FIG. 2 shows in elevation the system of the invention in operative condition to engrave symbologie on the tubesheet, the system comprising a laser assembly, a positioning mechanism connected to the laser assembly, a controller connected to the positioning mechanism, and a computer connected to the controller and to the laser assembly.
Figure 3:
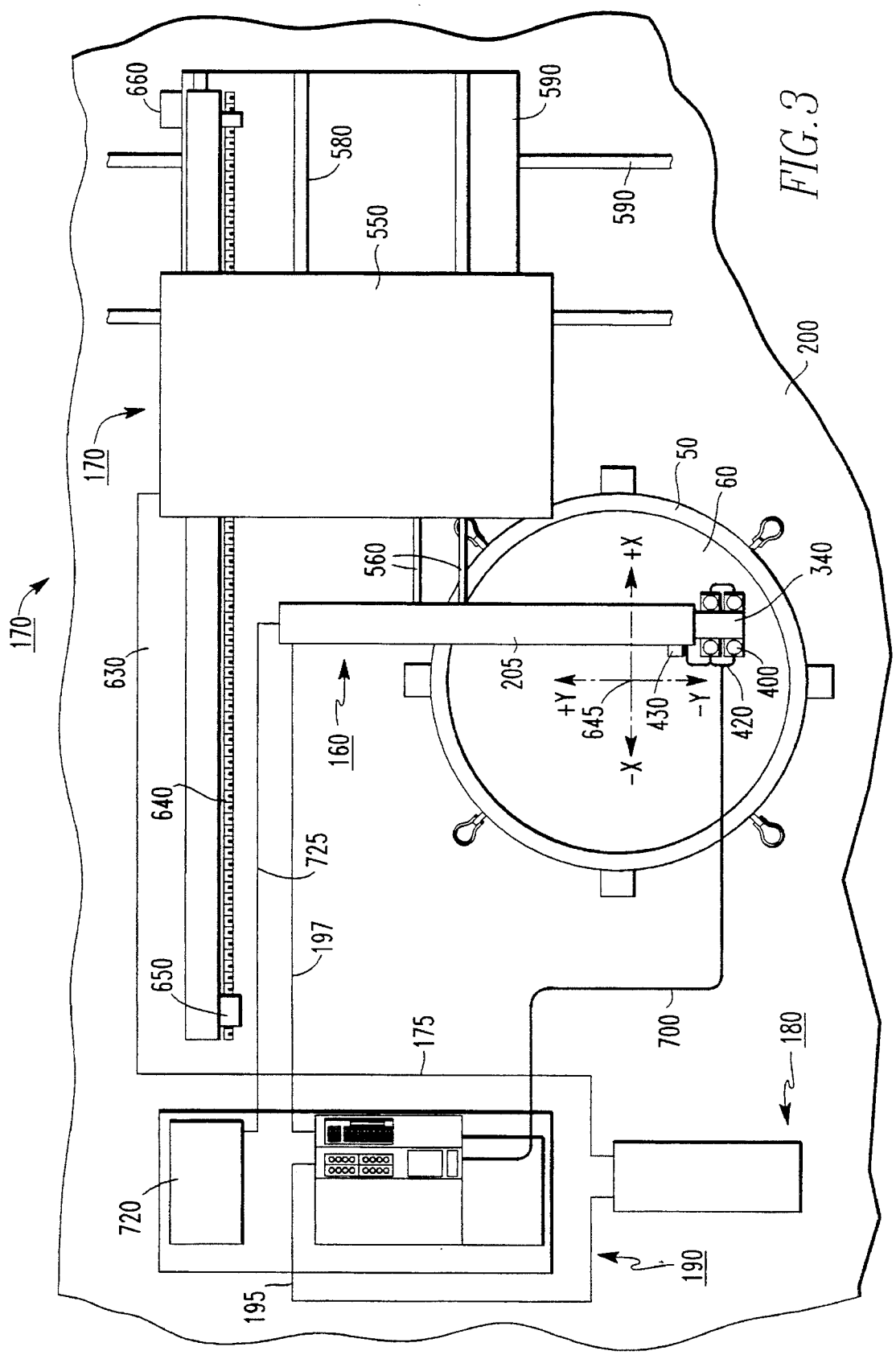
FIG. 3 is plan view of the system in operative condition to engrave symbologie on the tubesheet.

Turning now to FIGS. 2 and 3, there is shown the subject matter of the present invention, which is a laser engraving system, generally referred to as 150, for engraving an image on a workpiece, such as nuclear steam generator tubesheet 50. System 150 comprises laser means, such as a laser assembly generally referred to as 160, for emitting a monochromatic beam of laser light onto surface 60 of tubesheet 50 in order to engrave symbologie on surface 60. System 150 also comprises positioning means, such as a positioning mechanism generally referred to as 170, connected to laser assembly 160 for positioning laser assembly 160 with reference to tubesheet 50. In addition, system 150 comprises control means, such as a controller 180, electrically connected to positioning mechanism 170, such as by an electrical conducting cable 175, for controlling positioning mechanism 170, so that laser assembly 160 is controllably positioned thereby with reference to tubesheet 50. Moreover, system 150 comprises computer means, such as a computer generally referred to as 190, electrically connected to control means 180, such as by an electrical conducting cable 195, for receiving information describing the location of a predetermined target position on surface 60 communicated to it by controller 180. Computer 190 is also connected to laser assembly 160, such as by an electrical conducting cable 197, for operating laser assembly 160, such that laser assembly 160 emits laser light to engrave tubesheet 50 at the target position. As shown in FIGS. 2 and 3, system 150 and tubesheet 50 are supported by a floor 200.

Referring to FIGS. 4, 5, 6 and 7, laser assembly 160 comprises an elongate housing 205 having a hole 207 at one end thereof for passage of laser generated light through hole 207. Housed in housing 205 is a laser 210 for emitting periodically varying electromagnetic radiation that travels through hole 207 in the form of a monochromatic beam of light. More specifically, electrical power is supplied to laser 210, such as by a power supply 220, and emitted as electromagnetic radiation or light, the frequency of which is substantially constant and coherent. Laser 210 includes a cavity 230 capable of resonating at optical frequencies. A light source 240, such as a xenon-filled flash lamp, or the like, is interposed between at least two coaxially-aligned plane mirrors 245a/245b of high reflectivity, light source 240 being disposed in cavity 230. Light from light source 240 is reflected at each mirror 245a/245b to generate standing light wave patterns in cavity 230. However, because radiation losses occur in cavity 230, a radiation source capable of being excited by the radiation field to emit radiation in the form of light is provided such that the source emits radiation at optical frequencies in phase relationship with the radiation field in cavity 230 to compensate for the radiation losses in cavity 230. In the preferred embodiment of the invention, such a source is a Nd:YAG (Neodymium:Yttrium Aluminum Garnet) solid crystal 215 disposed-in cavity 230. In this regard, Nd:YAG crystal 215 comprises a plurality of $Nd^{3+}$ ions (i.e., approximately one weight percent of crystal 215 in the preferred embodiment) homogeneously dispersed in a matrix of $Y_3Al_5O_{12}$ for providing laser resonance or oscillation. Alternatively, crystal 215 may be a glass doped with $Nd^{3+}$ ions or crystal 215 may even be a suitable ruby (i.e., $Al_2O_3$), or the like. On the other hand, crystal 215 may be replaced by a suitable gas, such as $CO_2$, or the like, comprising carbon and oxygen ions capable of being excited by appropriate electrical means to emit the required electromagnetic radiation. However, an Nd:YAG laser is preferred because of the relatively high power densities achievable with the Nd:YAG laser. By way of example only, and not by way of limitation, laser 210 may have a power output of approximately 120 watts with a maximum power requirement of approximately 5 kW produced by approximately 460 volts, 3 phase current input at 60 Hz. Such a laser 210 is available, for example, from Electrox Industrial Lasers, Incorporated located in Indianapolis, Ind.

Still referring to FIGS. 4, 5, 6 and 7, housed in housing 205 and coaxially aligned with laser 210 is fluid-cooled light pulsing means, such as a water-cooled Q-switch 250, for receiving the beam of light emitted by laser 210 and for converting the beam of light received thereby into a plurality of light pulses defining a pulsed beam of light traveling along a predetermined pulsed light path 255. The Q-switch 250 of the present invention is fluid-cooled to carry-away heat energy absorbed by Q-switch 250, which heat energy might otherwise damage Q-switch 250. It is well known that a Q-switch transforms the beam of light emitted by a laser into laser light pulses of short duration and high peak power. Therefore, such a Q-switch increases the quality factor or "Q-factor" (i.e., frequency of oscillation divided by the line width of the laser output) of oscillation of resonating cavity 230. Q-switch 250 may be a suitable acousto-optic Q-switch available, for example, from Electrox Industrial Lasers, Incorporated. In use, Q-switch 250 provides a closed optic shutter for optically eliminating cavity 230 from the laser system by preventing optical system feedback. The optical shutter is then rapidly opened, after laser 210 is "pumped" in a manner well known in the art, for optically restoring cavity 230 to the system. As stated hereinabove, the purpose of Q-switch 250 is to generate laser pulses, which laser pulses may have a frequency of approximately 0–24 KHz and a power of approximately 120 watts for suitably engraving "INCONEL 600" surface 60.

Figure 6:
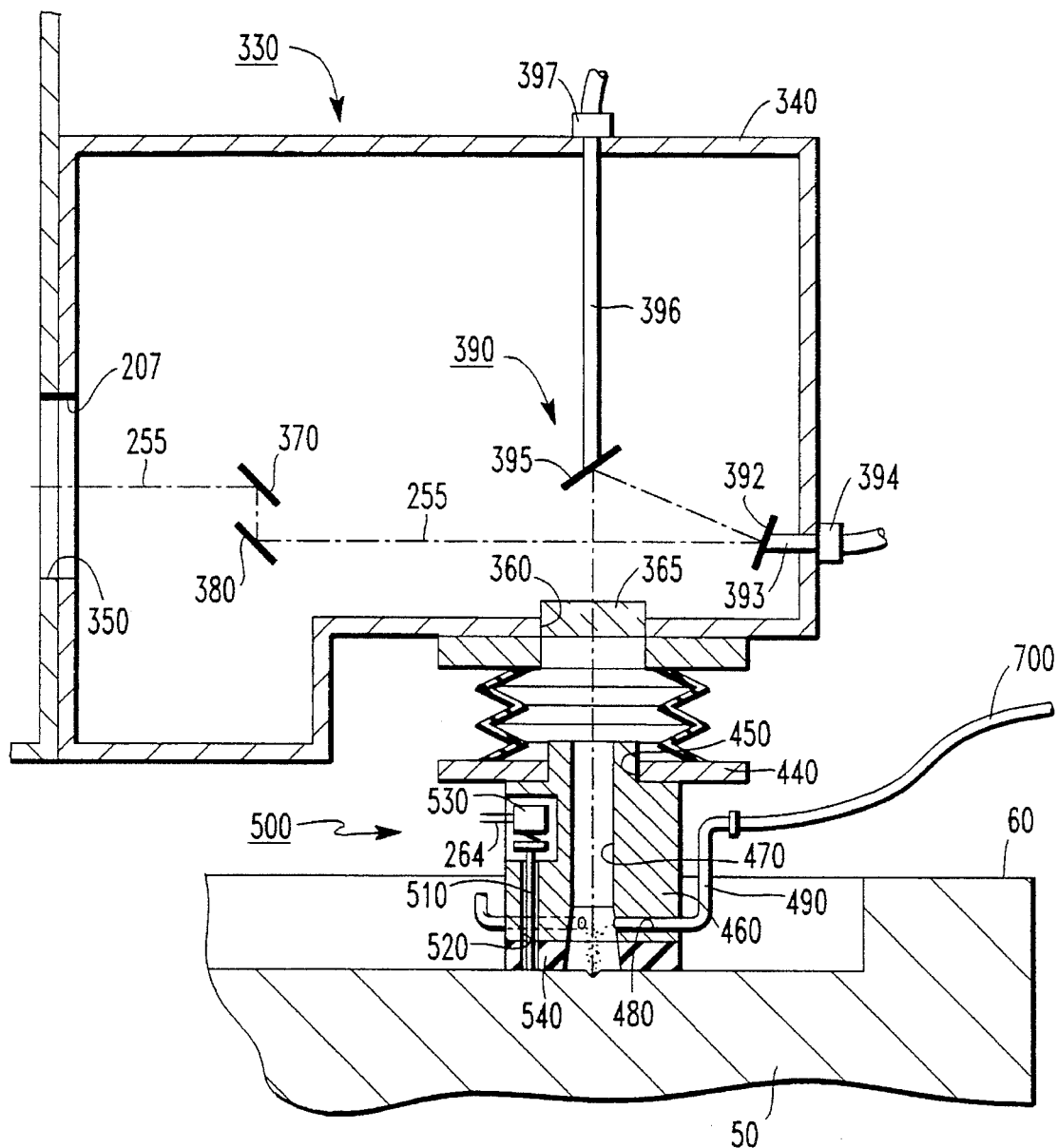
FIG. 6 is a view in partial elevation of a laser head belonging to the laser assembly.
Figure 7:
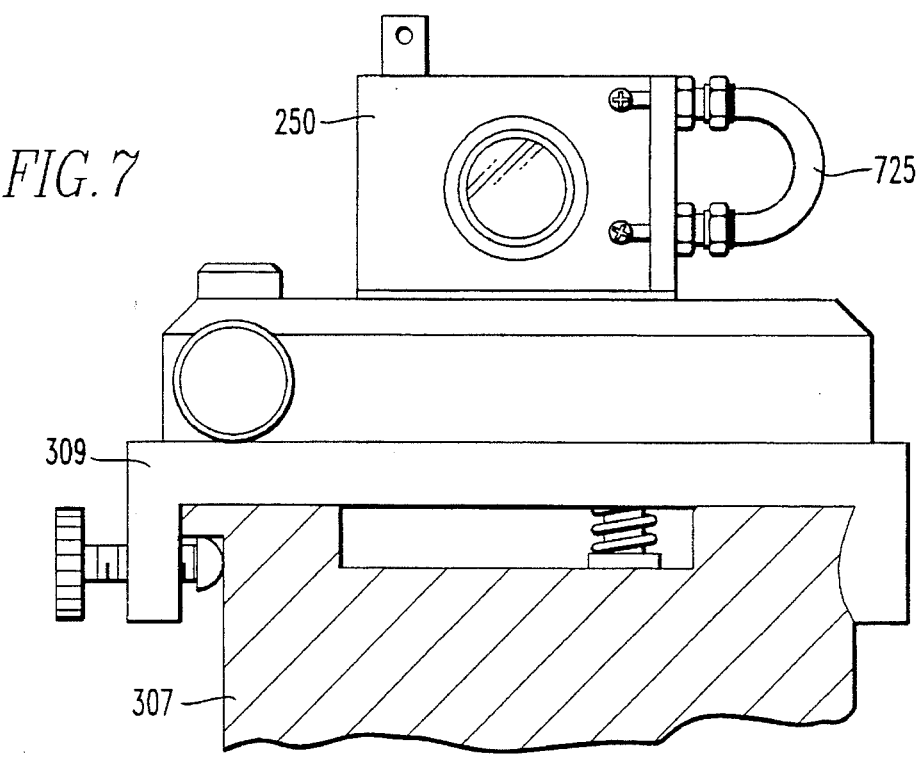
FIG. 7 is a view partial elevation of a light pulsing mechanism belonging to the laser assembly.
Figure 7A:
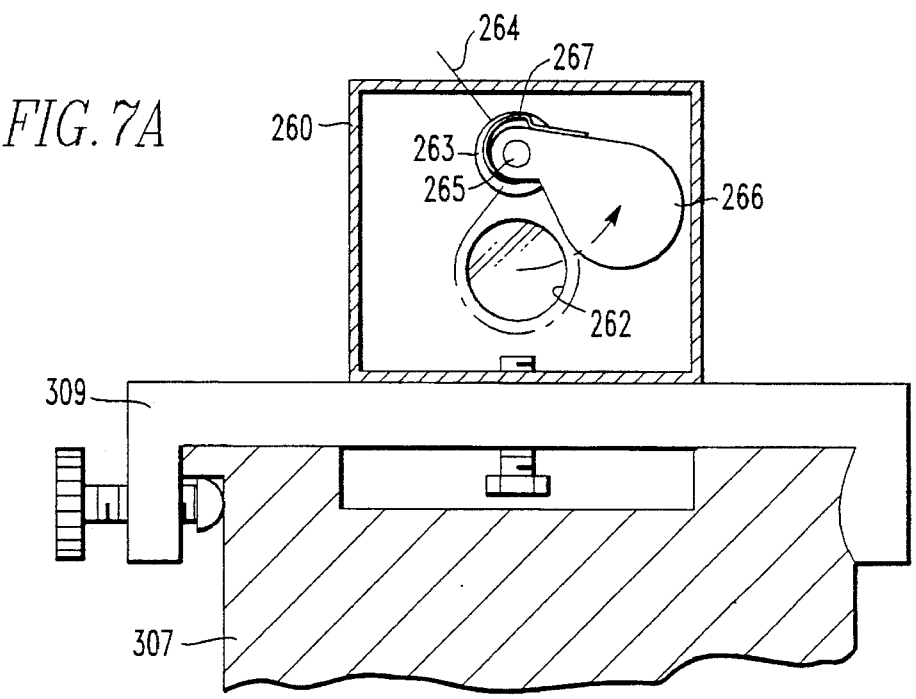
FIG. 7A is a view in elevation of a shutter belonging to the laser assembly.

As best seen in FIGS. 5 and 7A, also housed in housing 205 is a mechanical shutter 260 coaxially aligned with Q-switch 250 and laser 210, shutter 260 being adapted to be disposed in the pulsed light path 255 for periodically intercepting the pulsed beam of light provided by Q-switch 250. As described in more detail presently, mechanical shutter 260 selectively blocks and unblocks the pulsed beam of light. In this regard, shutter 260 is adapted to open for unblocking the pulsed beam of light and close for blocking the pulsed beam of light. Shutter 260 includes a hole 262 therethrough colinearly aligned with the pulsed beam of light so that the pulsed beam of light passes through hole 262. Connected to shutter 260 is an actuating mechanism or motor 263 electrically connected to a microswitch 530 (see FIG. 6), such as by an electrically conducting wire 264, as more fully described hereinbelow. As shown in FIGS. 5 and 7A, engaging motor 264 is an elongate shaft 265 which is capable of rotating about its longitudinal axis as motor 264 is energized. Motor 264 is energized as micro-switch 530 is operated, as described more fully hereinbelow. Attached to shaft 265 is a beam blocker 266 so that as shaft 265 rotates, beam blocker 266 simultaneously rotates to a like extent in the direction shown by the curved arrow in FIG. 5A. As beam blocker 266 rotates in the direction of the curved arrow, it uncovers hole 262 to allow the pulsed beam of light to pass through hole 262. Connected to the exterior of motor 263 and contacting beam blocker 266 is a coiled spring 267. Hence, it will be understood from the description hereinabove that when motor 263 is deenergized, which occurs when microswitch 530 is not operated, coiled spring 267 biases beam blocker 266 in the reverse direction of the curved arrow so that hole 262 is covered. Conversely, when motor 263 is energized, which occurs when micro-switch 530 is operated, beam blocker 266 moves in the direction of the curved arrow so that hole 262 is uncovered. Thus, motor 263 disposes beam blocker 266 to an open beam non-intercepting position for unblocking the pulsed beam of light and spring 267 biases beam blocker 266 to a closed beam intercepting position for blocking the pulsed beam of light. In this manner, the pulsed beam of light is blocked as beam blocker 266 covers hole 262 and is unblocked as beam blocker 266 uncovers hole 262.

Returning to FIGS. 4, 5, 6 and 7, also housed in housing 205 is an aperture 270 having a hole 280 which is coaxially aligned with shutter 260 and disposed in the pulsed light path 255. Aperture 270 "clips" the peripheral portion or circumferential edge of the beam of light so that the highest power density portion of the beam of light passes through hole 280 of aperture 270. In addition, housed in housing 205 is a collimator 290 having a hole (not shown) coaxially aligned with hole 280 for collimating the pulsed beam of light, in order to compensate for the divergence of the beam of light. Such a collimator 290 is desirable because the pulsed beam of light may tend to have a 5 mR (five miliradians) beam divergence from its predetermined pulsed light path 255. Also housed in housing 205 and coaxially aligned with the pulsed beam of light may be a He-Ne laser 300, or the like, and associated reflecting mirror 310. He-Ne laser 300 is electrically connected to a suitable power supply, such as power supply 320, for supplying electrical power to He-Ne laser 300. The purpose of He-Ne laser 300 is to emit a monochromatic beam of visible light along the predetermined pulsed light path 255 to allow the operator of system 150 to readily visually observe the alignment of the pulsed beam of light with the laser components housed in housing 205 and with the target position. Proper alignment of the laser beam through the components of laser assembly 160 avoids damage to the components. The He-Ne laser 300 is oriented such that the alignment beam is collinear with light beam path 255. Moreover, adjustably interconnecting laser 210, mirror 310, mirrors 245a/245b, Q-switch 250, shutter 260, aperture 270, and collimator 290 may be a plurality of segmented, accordion-like flexible protectors 305 for protecting the light beam from dust particle so that the intensity of the light beam is not lessened or diffused by such particles. In addition, laser 210, mirror 310, mirrors 245a/245b, Q-switch 250, shutter 260, aperture 270, and collimator 290 may each slidably engage an elongate rail member 307 by means of individually adjustable feet 309 for adjustably coaxially aligning or positioning laser 210, mirror 310, mirrors 245a/245b, Q-switch 250, shutter 260, aperture 270, and collimator 290 with reference to each other along rail member 307. Elongate rail member 307 is disposed longitudinally in elongate housing 205 and connected thereto by any suitable means, such as by welding.

Referring now to FIGS. 5 and 6, integrally connected, such as by screw fasteners 325, to housing 205 is a laser head, generally referred to as 330, for directing the pulsed beam of light 255 onto surface 60 of tubesheet 50. Laser head 330 comprise a generally elongate enclosure 340 having a first opening 350 coaxially aligned with hole 207 of housing 205 for passage of the pulsed beam of light through hole 207 and through first opening 350. Enclosure 340 also has a second opening 360 oriented parallel to surface 60 for passage of the pulsed beam of light therethrough such that the pulsed beam of light passes through second opening 360 to intercept surface 60, as more fully disclosed hereinbelow. Opening 360 may have a lens 365 therein for focusing the pulsed beam of light onto surface 60.

Still referring to FIGS. 5 and 6, disposed in enclosure 340 and adjustably connected thereto is first beam deflecting means, such as a first beam deflector or mirror 370 aligned with first opening 350, for deflecting the pulsed beam of light. First beam deflector 370 is adjustable and oriented so that the path of the pulsed beam of light 255 that travels through hole 207 and first opening 350 and that is incident on first beam deflector 370 is deflected or redirected by first beam deflector 370 at an angle of approximately 90° to its direction of incidence onto first beam deflector 370. Thus, the deflection of the pulsed beam of light 255 from first beam deflector 370 is in a direction generally normal to surface 60. Also disposed in enclosure 340 and adjustably connected thereto so as to intercept the pulsed beam of light deflected by first beam deflector 370 is second beam deflector means, such as a second beam deflector or mirror 380, for deflecting the pulsed beam of light. Second beam deflector 380 is adjustable and oriented so that the pulsed beam of light deflected by first beam deflector 370 is again deflected at an angle of approximately 90° to its direction of incidence onto second beam deflector 380. Thus, the direction of deflection of the pulsed beam of light from second beam deflector 380 is in a direction generally parallel to surface 60. Moreover, disposed in enclosure 340 is third beam deflecting means, generally referred to as 390, for deflecting the pulsed beam of light in a direction generally normal to surface 60 so as to engrave surface 60, as described in more detail presently. In this regard, third beam deflecting means 390 comprises a third beam deflector or mirror 392 disposed in enclosure 340 and aligned with second beam deflector 380 so as to receive the light reflected from second beam deflector 380. Connected to third beam deflector 392 is a first spindle 393 that engages a first galvo motor 393, first spindle 394 being adapted to adjust third beam deflector 392 with respect to second beam deflector 380. As first galvo motor 394 is operated, third beam deflector 393 is adjusted such that the pulsed beam of light incident on third beam deflector 392 is redirected at a predetermined azimuth or elevation with reference to the light incident upon it. Third beam deflecting means 390 also comprises a fourth beam deflector 395 for receiving the beam of light reflected by third beam deflector 392. Fourth beam deflector 395 is disposed in enclosure 340 for redirecting the pulsed beam of light received from third beam deflector 392 along an axis generally normal to surface 60 to engrave surface 60. Connected to fourth beam deflector 395 is a second spindle 396 that engages a second galvo motor 397, second spindle 396 being adapted to adjust fourth beam deflector 395 with respect to third beam deflector 392. As second galvo motor 397 is operated, fourth beam deflector 395 is adjusted such that the pulsed beam of light reflected from third beam deflector 392 is intercepted by fourth beam deflector 395 and redirected at the predetermined angle (i.e., generally normal to surface 60) to intercept surface 60. Galvo motors 394 and 397 operate beam deflectors 392 and 395 so as to controllably direct the pulsed light beam in the X and Y directions, respectively, as described more fully hereinbelow.

Referring again to FIGS. 5 and 6, attached to enclosure 340 is a pneumatic cylinder, which may be a hydraulic cylinder 400, having a post 410 slidably engaging cylinder 400. Connected to cylinder 400 is a conduit 420 which is in fluid communicating with an electrically operated solenoid valve 430 for controlling the amount of hydraulic fluid supplied to and/or withdrawn from cylinder 400. Solenoid valve 430 is adapted to selectively operate cylinder 400 such that post 410 is capable of outwardly slidably extending toward surface 60 and inwardly slidably retracting away from surface 60. A platform 440, having a hole 450 for allowing passage therethrough of the pulsed beam of light, is attached to post 410, so that platform 440 outwardly extends as post 410 outwardly extends and inwardly retracts as post 410 inwardly retracts. Attached to platform 440 is a generally cylindrical boot member or shield 460 having a longitudinal bore 470 therethrough coaxially aligned with hole 450 for passage of the pulsed beam of light. Bore 470 is oriented perpendicularly with reference to surface 60 so that the pulsed beam of light passes through hole 450 and through bore 470 to be intercepted by surface 60. Moreover, formed through shield 460 and in communication with bore 470 is a channel 480, for reasons disclosed hereinbelow. Interconnecting platform 440 and shield 460 may be a segmented, accordion-like flexible protector 465 for protecting operating personnel from contacting the pulsed light beam. Thus, protector 465 serves a safety function. For reasons disclosed in more detail presently, engaging channel 480 is a vacuum conduit 490 for vacuuming any extraneous particulate matter or fines released from surface 60 by the lasing process as the pulsed laser beam engraves surface 60. It is important to vacuum such particles from surface 60 in order to ensure that the intensity of the pulsed beam of light is not lessened or diffused by the particles and to reduce the potential inventory of particles that would otherwise be present in the primary fluid of steam generator 10 when the completely fabricated tubesheet 50 is used in steam generator 10. Reducing the amount of particles or fines in the primary fluid mitigates the effect of stress corrosion cracking in tubes 30 and in surface 60. Moreover, attached to shield 460, so as to be interposed between surface 60 and shield 460, may be an annular ring member 540, which may be any relatively soft material, such as soft rubber or the like, for preventing marring or scratching of surface 60 as shield 460 contacts surface 60 during the lasing process. This is important because marring or scratching of surface 60 might otherwise provide sites for accumulation of corrosive particulate matter, which accumulation of particulate matter may in turn lead to stress corrosion cracking in surface 60.

Referring yet again to FIGS. 5 and 6, a shutter activation switch, generally referred to as 500, is provided for activating shutter 260 as shield 460 contacts surface 60. In the preferred embodiment of the invention, shutter activation switch 500 is connected to shield 460 and comprises an elongate pin 510 slidably disposed in a bore 520 formed in shield 460, pin 510 having a first end thereof adapted to contact or engage surface 60 as shield 460 contacts surface 60. Shutter activation switch 500 also comprises a micro-Switch 530 connected to shield 460, the micro-switch 530 capable of being contacted by a second end of pin 510 as pin 510 engages surface 60 and inwardly slides in bore 520. Pin 512 outwardly slides in bore 520 to return to its original position by action of biasing means, such as a suitable spring member (not shown) surrounding the second end of pin 510 when pin 510 does not contact or engage surface 60. Micro-switch 530 is electrically connected to shutter 260 to operate shutter 260 so that shutter 260 opens as pin 510 inwardly slides in bore 520 and the second end thereof contacts micro-switch 530. Shutter 260 closes when pin 510 outwardly slides in bore 520 and the second end thereof does not contact microswitch 530. Thus, it will be understood from the description hereinabove that shutter 260 is only opened when the second end of pin 510 contacts micro-switch 530 which occurs as the first end of pin 510 engages surface 60 to cause pin 510 to inwardly slide in bore 520. In addition, the laser beam is blocked when shutter 230 is closed when the second end of pin 510 does not contact micro-switch 530, which only occurs as the first end of pin 510 disengages surface 60. It is important that shutter activation switch 500 be present. This safety feature of the invention is important in order to preclude the operator of system 150 from inadvertently interposing himself in the path of the laser beam (i.e., between shield 460 and surface 60). This is so because shield 460 blocks the operator from interposing himself between the laser beam and surface 60 as pin 510 engages surface 60. This feature of the invention avoids injury to the operator as the laser beam engraves surface 60 because shutter 260 is only opened when pin 510 engages surface 60 which occurs only when shield 460 rests on surface 60.

Returning to FIGS. 2 and 3, positioning mechanism 170 moves housing 205 to a predetermined X-coordinate and Y-coordinate associated with surface 60 of tubesheet 50, as described in detail hereinbelow. In this regard, positioning mechanism 170 includes a first carriage 550 connected to housing 205, such as by a plurality of brackets 560, for moving housing 205. First carriage 550 may include a plurality of first wheels 570 adapted to slidably engage respective ones of a plurality of elongate first rails 580. First rails 580 are connected to a base 590 having a plurality of second wheels 600 adapted to slidably engage respective ones of a plurality of elongate second rails 610 that may be connected to floor 200, second rails 610 being oriented orthogonally with reference to first rails 580. Thus, it will be appreciated from the description provided immediately hereinabove that housing 205 moves in the Y-direction (see FIG. 3) with reference to tubesheet 50 as base 590 moves on second rails 610. Of course, first rails 580 allow first carriage 550 to move orthogonally with reference to the direction of movement of base 590. Thus, housing 205 moves in the X-direction (see FIG. 3) with reference to tubesheet 50 as first carriage 550 moves on first rails 580 and housing 205 moves in the Y-direction (see FIG. 3) with reference to tubesheet 50 as base 590 moves on second rails 610.

Figure 8:
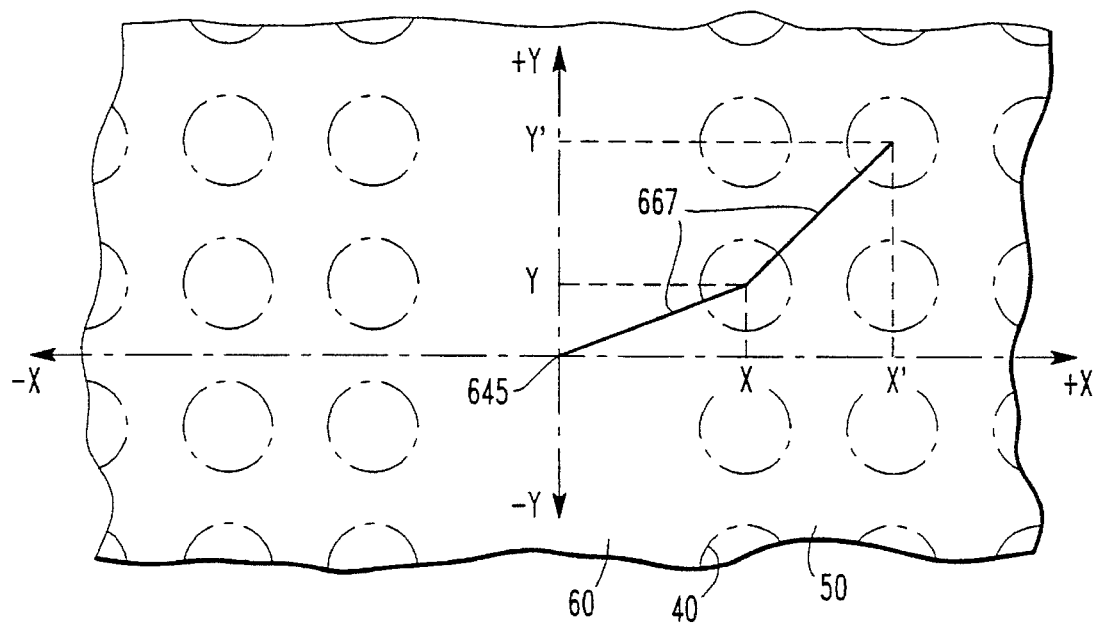
FIG. 8 is a fragmentation view of the tubesheet having tube hole locations, the tube hole locations being shown in phantom.

Referring to FIGS. 2, 3 and 8, connected to base 590, such as by a support 620, is a second carriage 630 having movement means, such as a rotatable lead screw 640, engaging first carriage 550 for moving first carriage 550 on first rails 580, so that first carriage 550 moves to the predetermined X-coordinate associated with surface 60 of tubesheet 50. A reversible variable speed first motor 650 engages lead screw 640 for rotating lead screw 640 so that first carriage 550 moves housing 205 in the X-direction as first motor 650 rotates lead screw 640. In addition, a reversible variable speed second motor 660 is connected to base 590 for energizing second wheels 610 to move base 590 on second rails 610. First motor 650 and second motor 660 are capable of simultaneously operating to simultaneously operate first carriage 550 and second carriage 630 so that housing 206, and hence laser assembly 160 associated therewith, move to the predetermined X-coordinate and Y-coordinate along a straight vector 667 beginning initially at a "reference position" 645 and terminating at a first predetermined target position and then moving from the first target position to a second target position, if desired. It will be appreciated that the geometric center of surface 60 is defined as the "reference position" 645 and has coordinate values of X=0.0 and Y=0.0.

As best seen in FIGS. 2 and 8, controller 180 includes a cabinet 665 that houses electronic circuitry 670 for controlling motors 650/660. Computer 190, which is electrically connected to controller 180 and to laser assembly 170, is capable of operating lasers 300 and 210. Controller 180 controllably operates positioning mechanism 170 to position laser assembly 160 at the predetermined X-coordinate and Y-coordinate (i.e., the predetermined target position). Computer 190 controllably operates lasers 300 and 210 to emit the pulsed beam of light to engrave the image at the target position. In addition, computer 190 includes a user interface, such as a computer keyboard 690, for designating the lasing parameters and also includes a cathode ray tube monitor 697 for displaying the lasing parameters and the X-coordinates and Y-coordinates designating the target positions on tubesheet 50.

Referring to FIGS. 2, 3 and 7, in communication with vacuum conduit 490, such as by a vacuum hose 700, is a vacuum pump 710 and storage canister 715 for vacuuming and storing any particulate matter produced from surface 60 by the lasing process. The particulate matter that accumulates in canister 715 is discarded in the usual manner as waste. In addition, in communication with Q-switch 250 is a chiller device 720 for circulating cooled fluid (e.g., cooled water) through Q-switch 250, by means of hose 725, so that Q-switch 250 does not overheat.

Figure 9:
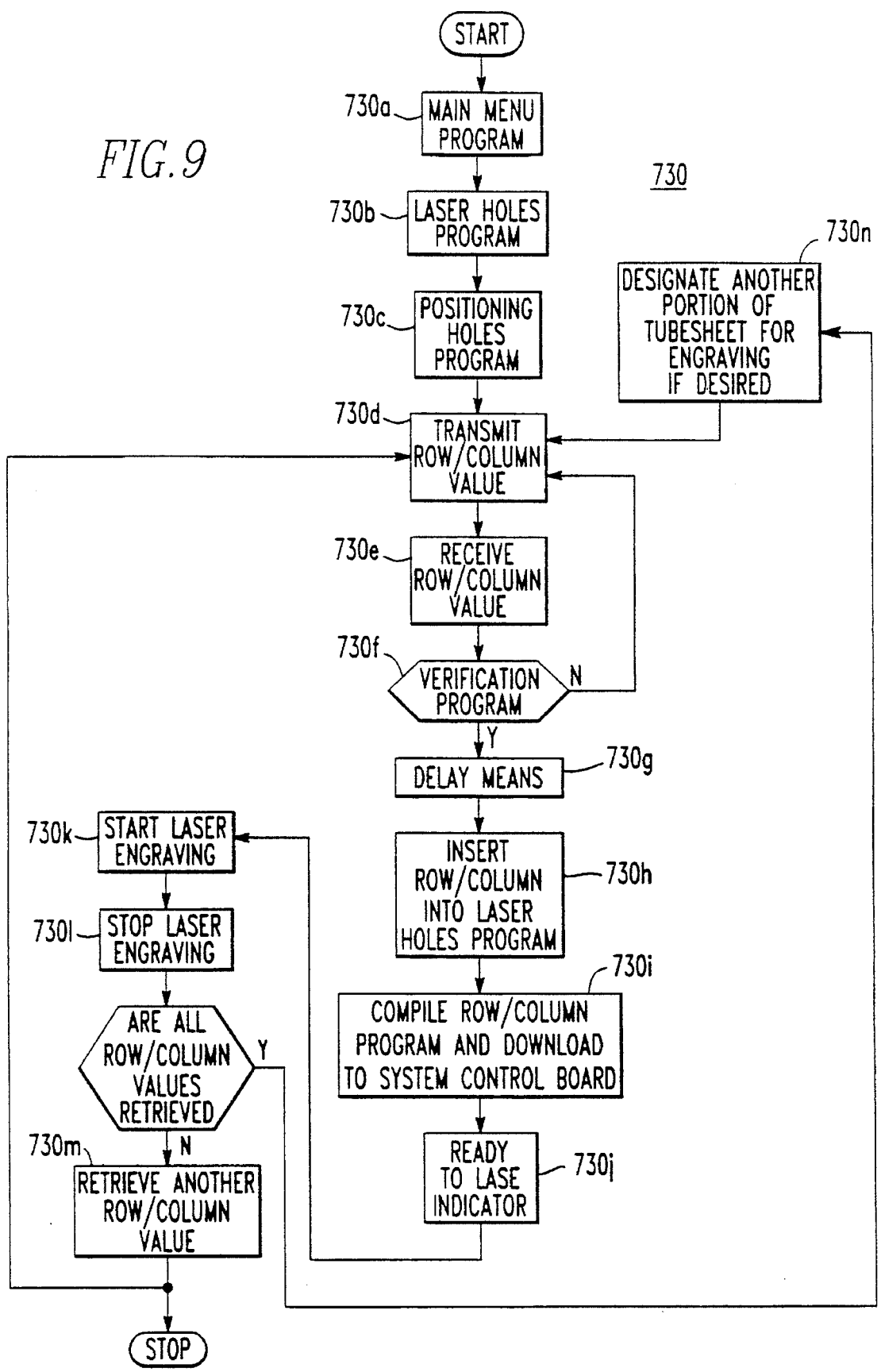
FIG. 9 shows a flowsheet of the lasing process.

Referring to FIGS. 8 and 9, a flowchart, generally referred to as 730, schematically illustrates selected steps of the lasing process and the computer programs associated therewith for engraving symbologie on surface 60 adjacent each tube hole location 40. With respect to the computer programs, a Main Menu Program 730*a*, that is stored in memory 680 of computer 190, displays a plurality of options on monitor 697, any one or more of which the operator may select by means of keyboard 690. For example, the operator may select an option that designates that only a predetermined one-half of all possible tube hole locations 40 of tubesheet 50 are to be engraved rather than all possible tube hole locations. That is, the operator may select tube hole locations 40 to be engraved corresponding to a predetermined first one-half of tube sheet 50 because the other half of tube sheet 50 is a mirror image of the first half. It will be appreciated that the other half of tubesheet 50, referred to immediately hereinabove, is a mirror image of the first half of tubesheet 50 due to the U-shape configuration of tubes 30 supported by tubesheet 50. When this option is selected, a Laser Holes Program 730*b* is automatically "loaded" into memory 680 by the Main Menu Program, the Laser Holes program 730*b* containing the information that only the predetermined first one-half of all tube locations are to be engraved rather than all possible tube hole locations. Another option displayed by the Main Menu Program controls certain predetermined lasing parameters, such as the duration that the pulsed beam of light contacts surface 60. This option is presented to the operator because a suitable duration of the pulsed beam of light on surface 60 determines the depth of cut which in turn depends on the thickness and type of material (e.g., stainless steel, "INCONEL 600" or other material) to be engraved. When this option is selected by the operator, the Main Menu Program 730*a* calls a Scribing Program which allows the operator to select the characteristics of the symbologie. That is, the Scribing Program contains a plurality of selectable fonts, font sizes, and font orientation which are used for describing the calligraphic characteristics of the desired symbologie. It will be appreciated that the unique alphanumeric symbologie engraved near the predetermined X/Y target position is obtained by controlling third beam deflecting means 392 and fourth beam deflecting means 395 by means of galvo motors 394 and 397, which are electrically connected to computer 190. Galvo motors 394 and 397 are controllably operated by the Scribing Program stored in memory 680 of computer 190, which Scribing Program transmits electrical signals to galvo motors 394/397. After the appropriate options are selected by the operator, the data associated with each selected option are loaded into memory 680 of computer 190.

Referring again to FIGS. 8 and 9, the operator loads a Positioning Holes Program 730*c* and a Verification Program 730*f* into memory 670 of controller 180 by means of a floppy diskette or hard disk (not shown), or the like. The Positioning Holes Program 730*c* contains therein the predetermined locations of tube holes 40 comprising the portion (e.g., first one-half portion of all tube hole locations) of surface 60 designated by the Laser Holes Program 730*a* for engraving. The center of each tube hole location 40 defines a predetermined X/Y cartesian coordinate in relation to its distance from the reference position 645. For example, a tube hole location having coordinates of X=−0.205 and Y=+0.424 means that the center of that tube location is located on surface 60 at a negative value of 0.205 inches along the X-axis with respect to the reference position (X=0.0, Y=0.0) and at a positive value of 0.424 inches along the Y-axis with respect to the reference position (X=0.0, Y=0.0). Moreover, each X-value is assigned a unique row designation "R" and each Y-value is assigned a unique column designation "C". For example, X=−0.205 may be assigned a row designation of 100 ("R100") and Y=0.424 may be assigned to a column designation of 200 ("C200") for that particular tube hole location, such that the tube hole location has both a spatial value of X=−0.205, Y=0.424 inches with respect to the reference position (X=0.0, Y=0.0) and an assigned row and column designation of R100 and C200, respectively. Thus, the Positioning Holes Program 730*c* may comprise a plurality of predetermined X/Y coordinates and associated row and column locations, which may be in assembler or hexadecimal format. The X/Y coordinates and assigned row and column designations stored in memory 570 of controller 180 are constant in the sense that the locations of the coordinates and the text comprising row and column designations are predetermined and do not vary for the particular model of tubesheet 50 being engraved. In this regard, it will be understood that a particular model or design of steam generator 10 will have a predetermined number of tubes 30 and tube hole locations 40 and a predetermined spacing or pitch between adjacent tube hole locations 40. The Positioning Holes Program 730c also contains the character string or text (e.g., "R100" and "C200") associated with the row and column that is uniquely associated with each X/Y location (i.e., each tube hole location 40) for providing traceability of the materials and fabrication techniques used to make the tube 30 that will occupy that particular tube hole location 40. More specifically, the Positioning Holes Program 730c, which is stored in controller 180, selects the text (i.e., row and column designation) associated with a unique X/Y coordinate value and includes means 730d for transmitting the associated text to computer 190 which has means 730e to receive the text transmitted by controller 180. The text is transmitted to computer 190 through cable 195. For reasons provided presently, the text received by computer 190 is then returned to controller 180, such as by cable 195, for verification.

Still referring to FIGS. 8 and 9, the text received by computer 190 is returned to controller 180 for verification. In this regard, controller 180 has the Verification Program 730f stored in memory 670 to verify or confirm the text by comparing the returned text to the transmitted text. In this sense, Verification Program 730f performs a parity check. It is important that the transmitted text be compared to the returned text. Such a comparison is important because the transmitted text may differ from the returned text. This difference may be due to the effect of electrical "noise" (i.e., electromagnetic interference) in the immediate area surrounding system 150 caused, for example, by the operation of nearby machinery. If, after several tries (e.g., three tries), the text returned to controller 180 is not verified in the manner described hereinabove, then the lasing process is suspended and the cause of the non-verification is investigated by the operator. If the text returned to controller 180 is verified in the manner described hereinabove, then the verified text is transmitted to computer 190 which loads the verified text into a Laser Holes Program 730h stored in memory 680. In the preferred embodiment of the invention, Laser Holes Program 730h includes a compiler 730i (e.g., a "C-language" compiler) that compiles the assembler or hexadecimal text and then "downloads" this compiled data into a system control board or electronic circuitry contained in memory 680. Such a system control board may be an Electrox "6800 System Control Board" available from Electrox Industrial Lasers, Incorporated. After the text is downloaded into memory 680, computer 190 indicates a "ready-to-lase" condition 730j by, for example, displaying an appropriate indicator (not shown) on monitor 697 or by providing a suitable annunciator. In addition, after the text is verified by the Verification Program stored in controller 180, controller 180 transmits a signal, such as by means of cable 175, to motors 650/660 belonging to positioning mechanism 170 for simultaneously operating motors 650/660 so that positioning mechanism 170 moves laser head 160 along a straight vector 667 to the verified X/Y target position. A delay (e.g., six seconds) is actuated by suitable delay means 730g before laser 210 is operated to initiate lasing in order to provide enough time to download the row and column information into memory 680. After this delay (e.g., six seconds), controller 180 instructs the system control board belonging to computer 190 to start the lasing or engraving process, as at 730k in FIG. 9. The Scribing Program is called as the system control board belonging to computer 190 operates laser 210. Laser 210 then begins engraving symbologie adjacent a first X/Y location (i.e., a first target position). The engraving process is continued for a predetermined time depending on the thickness and type of material to be engraved. After the required symbologie are engraved at the first X/Y location, the engraving process at the first X/Y location is terminated, as at 7301 and the memory 680 is reinitialized (i.e., the X/Y value and associated text are erased from memory 680).

Another row and column value is then retrieved as at 730m. Controller 180 then selects another X/Y location, referred to herein as a X'/Y' location, and transmits its associated text to computer 190 and the process described hereinabove is repeated. After the portion of tubesheet 50 (e.g., the first one-half of all tube hole locations) designated by the Laser Holes Program 730h is engraved, the engraving process is terminated by computer 190 unless engraving at additional tube hole locations (e.g., the remaining half of all tube hole locations) is desired. If engraving at additional tube hole locations is desired, then the process described hereinabove is repeated starting at block 730n of FIG. 9.

Figure 8A:
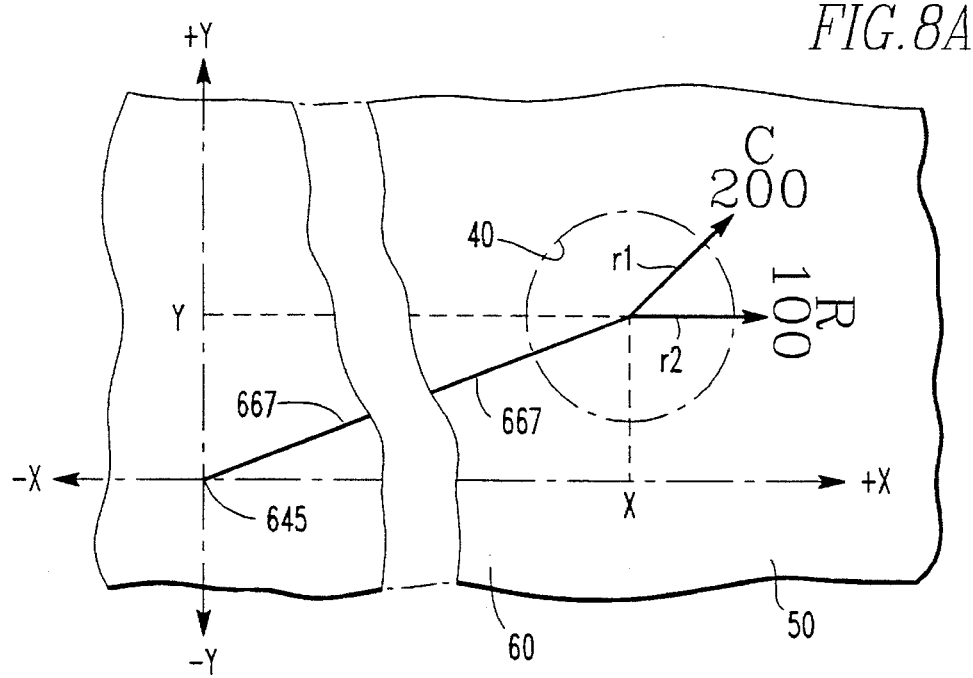
FIG. 8A shows another view of the tubesheet having symbologie engraved thereon at radii "r1" and "r2" from the center of a tube hole location.

Referring to FIGS. 8, 8A and 9, tubesheet 50 is shown having alphanumeric symbologie engraved thereon adjacent respective ones of steam generator tube hole locations 40. The symbologie are shown engraved at off-set radii positions "r1" and "r2" with respect to the center of hole location 40.

Figure 10:
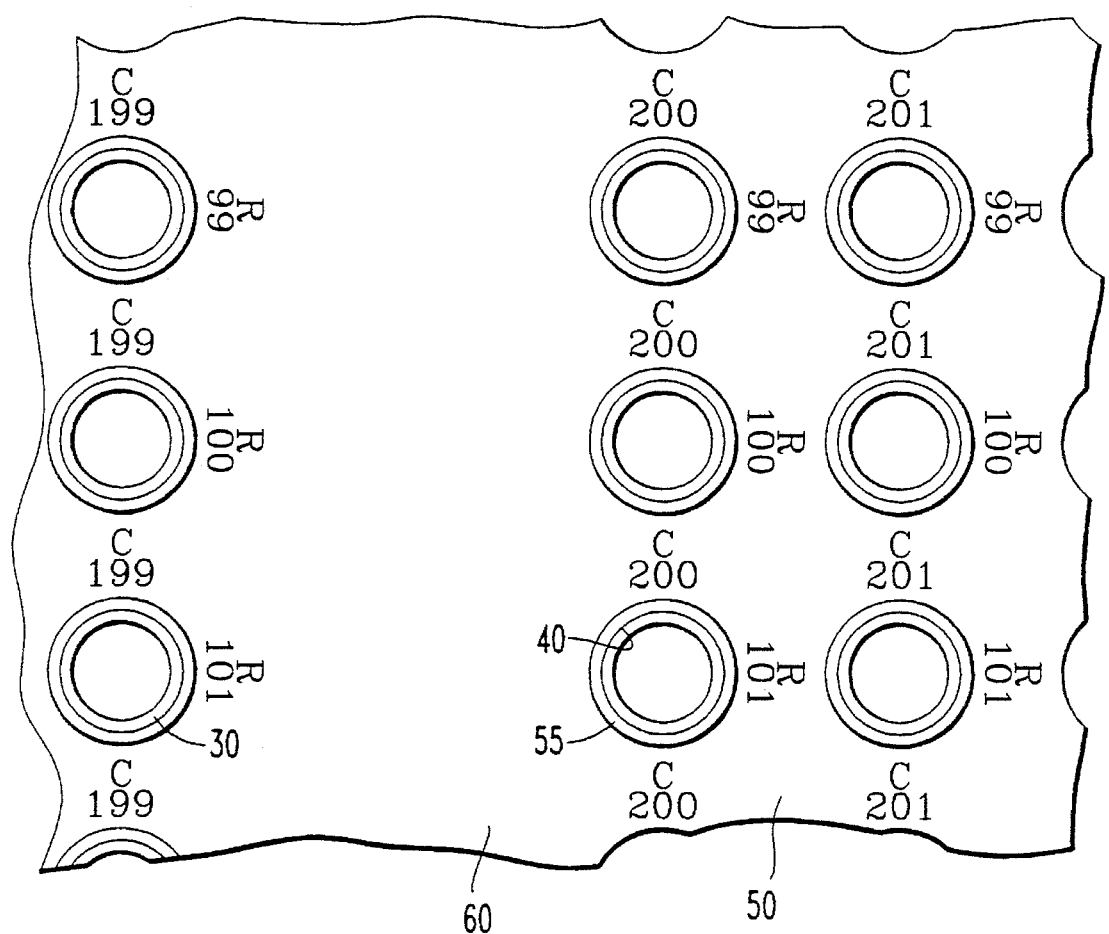
FIG. 10 is a view of the tubesheet having the symbologie engraved thereon adjacent tube ends extending through the tube holes, the tube ends being affixed to the tubesheet by weldments.

Turning now to FIG. 10, holes 40 are preferably bored through tubesheet 50 after the engraving process is completed. Next, the ends of tubs 30 are inserted through their respective holes 40 and affixed thereat by means of weldments 55.

OPERATION

During operation of system 150, laser head 340 is positioned at the reference position (X=0.0, Y=0.0). In this regard, base 590 is moved to a position sufficiently adjacent tube sheet 50, such as by operating second motor 590, so that second wheels 600, which belong to base 660, ride on second rails 610. In this manner, base 590 will travel in a direction generally parallel to the Y-axis. First motor 650 is activated to rotate lead screw 640 which is connected to second carriage 630 and which engages first carriage 550. As lead screw 640 rotates, it translates first carriage 550 in a direction generally parallel to the X-axis. In this manner, first motor 650 and second motor 660 are operated to move laser head 340 to the reference position (X=0.0, Y=0.0) such that bore 470 belonging to shield 460 is centered at the reference position.

Computer 190 is activated by the operator of system 150. When the computer 190 is activated, the Main Menu Program is "loaded" into storage memory 680. The operator selects, such as by means of keyboard 690, the appropriate options presented by the Main Menu Program. After the appropriate options are selected by the operator, the Laser Holes Program is automatically loaded into memory 680 by the Main Menu Program.

Controller 180 is activated by the operator of system 150. When controller 180 is activated, the Positioning Holes Program and the Verification Program are "loaded" into storage memory 670 of controller 180. The Positioning Holes Program selects an X/Y location and then transmits to computer 190 the associated text uniquely associated with the X/Y tube hole location 40 to be first engraved. The text received by computer 190 from controller 180 is returned to controller 180 for verification.

The Verification Program stored in memory 670 verifies the text and, if verified, transmits it to computer 190 which loads the associated text into a Laser Holes Program 730h stored in memory 680. The Laser Holes Program compiles and then downloads the compiled text information into the system control board. Moreover, after the associated text is verified, controller 180 instructs positioning mechanism 170 to move laser head 330 to the X/Y coordinates along straight vector 667 to engrave symbologie centered about the verified X/Y coordinates. After the verified text is downloaded into the System Control Board, Laser Holes Program 730h indicates a "ready-to-lase" condition and starts the lasing or engraving process by activating laser 210 to engrave symbologie centered about location X/Y. The engraving process is continued for a predetermined time depending on the thickness and type of material to be engraved. At the end of that time, the engraving process is automatically terminated by computer 190 and the X/Y value and associated text are erased from memory 680. Controller 180 then transmits another X/Y coordinate (i.e., X'/Y' coordinate) value and associated text to computer 190. The process described hereinabove is repeated until all selected holes 40 belonging to the selected portion (e.g., the first one-half of all possible tube hole locations) of surface 60 have unique engraved symbologie. Of course, it will be appreciated that the unique alphanumeric symbologie engraved at the X/Y and X'/Y' locations are obtained by controlling third beam deflector 392 and fourth beam deflector 395 by means of galvo motors 394 and 397, respectively, as previously described. Galvo motors 394 and 397 are in turn controllably operated by the Scribing Program stored in memory 680 of computer 190.

The operation of laser assembly 160 will now be described. Power supply 320 is operated to supply power to He-Ne laser 300 for aligning the visible light-beam emanating from He-Ne laser 300 so that the laser beam emitted by laser 210 will be coaxially aligned with the components of laser assembly 160. More specifically, the components of laser assembly 160 are adjustably aligned such that the laser beam emanating from He-Ne laser 300 is collinear with beam path 255. In this regard, mirrors 245a/245b, Q-switch 250, Nd:YAG laser 210, shutter 260, aperture 270 and collimator 290 are positioned on rail member 307, such as by means of their respective adjustable feet 309, so that the light beam emanating from He-Ne laser 300 is coaxially aligned with the components of laser assembly 160 and colinearly aligned with beam path 255. Power supply 220 is then activated by computer 190, as previously described, so as to supply power to laser 210. The laser light emitted by laser 210 resonates in cavity 230 and is controllably released by Q-switch 250 so as to generate a pulsed beam of light traveling along pulsed light path 255, which pulsed beam of light may have a power of approximately 120 watts for suitably engraving tubesheet 50 which may be "INCONEL".

Solenoid valve 430 is activated to supply hydraulic fluid to conduit 420 for selectively extending and retracting platform 440. Platform 440 is outwardly extended until ring member 540 belonging to shield 460 contacts surface 60. As ring member 540 contacts surface 60, the first end of pin 510 engages surface 60 so that pin 510 slides in bore 520. As pin 510 slides in bore 520, the second end thereof contacts micro-switch 530 which sends an electrical signal to motor 263 for moving beam blocker 266 such that hole 262 of shutter 260 is uncovered. As hole 262 is uncovered, the pulsed beam of light emanating from Q-switch 250 passes through hole 262. After the pulsed beam of light passes through hole 262, it passes through aperture 270 so that the highest power density of the beam of light passes through hole 280 of aperture 270. Next, the pulsed beam of light passes through collimator 290 for collimating the pulsed beam of light.

The pulsed beam of light emanating from collimator 290 passes through hole 207 formed in housing 205 and from there passes through first opening 350 of enclosure 340. After the pulsed beam of light passes through opening 350 it is intercepted by first beam deflector 370 which redirects the light to second beam deflector 380. Second beam deflector 370 in turn redirects the pulsed beam of light to third beam deflector 390, which is controlled by first galvo motor 394. First galvo motor 394 is itself controllably operated by the Scribing Program stored in computer 190. The third beam deflector 392 redirects the pulsed beam of light to fourth beam deflector 390, which is controlled by second galvo motor 397. Second galvo motor 397 is itself controllably operated by the Scribing Program. Fourth beam deflector 395 redirects the pulsed beam of light through lens 365 for focussing the pulsed beam of light onto surface 60. Moreover, as the pulsed beam of light passes through lens 365, it passes through bore 470 formed through shield 460. As the pulsed beam of light passes through bore 470 it is intercepted by surface 60 adjacent the target position for engraving symbologie at "r1" and "r2".

However, as the pulsed beam of light engraves surface 60, extraneous metallic micro-particles or fines may be produced. Therefore, vacuum pump 710 is operated to vacuum the particles from surface 60, through hose 700 and into canister 715, so that the engraved symbologie are particle-free. Moreover, applicants have discovered that the profile of the symbologie engraved at the target position is relatively smooth such that the extraneous particles do not substantially adhere to or "hide-out" in the lased crevice defined by the engraved symbologie. After all desired symbologie are suitably engraved on surface 60, laser assembly 160 is removed from its position adjacent tubesheet 50 by operating motors 650/660.

It will be appreciated from the teachings herein, that the present invention obtains several advantages. For example, each tube 30 may be assigned unique symbologie having a one-to-one correspondence with the materials and fabrication methods used to make it. Thus, the materials and methods used to manufacture each tube 30 are readily traceable. Moreover, the font size and font orientation are controlled by the Scribing Program so that the symbologie may be sized and oriented to fit within the space available between the closely-spaced tube ends extending through tubesheet 50. Thus, interpolation of tube identifiers is unnecessary because tube hole identifiers can be engraved at each tube hole location, if desired, rather than at every other tube hole location. In addition, applicants have discovered that the laser beam produces symbologie having a consistent depth of cut so that each symbologie is clearly visible and accurately readable to avoid errors in identifying tubes 30. Another advantage of the present invention is that the engraving process does not work harden the tube sheet material because the symbologie are produced by vaporizing the tubesheet material using a laser beam rather than by impression stamping. Still another advantage of the present invention is that the engraved symbologie are particle-free because any extraneous particles or fines produced by the lasing process are vacuumed away from surface 60 by means of vacuum pump 710 and canister 715. Yet another advantage of the present invention is that the risk of damaging the weldments 55 surrounding the tube ends is eliminated because the symbologie are engraved on surface 60 before the weldments 55 are applied to support tubes 30.

Although the invention is fully illustrated and described herein, it is not intended that the invention as illustrated and described be limited to the details shown, because various modifications may be obtained with respect to the invention without departing from the spirit of the invention or the scope of the equivalents thereof. For example, Q-switch 250; may be a photochemical Q-switch having a photochemical substance in the form of a thin film of dye, such as a $2 \times 10^{-9}$ concentration of cyptocyanine solution, contained in a small cell in the Q-switch. In such a Q-switch, the dye is rapidly temporarily bleached when the intensity of light radiation builds up to a sufficiently high level during "pumping" of laser 210. As the dye is bleached, the Q-factor of cavity 230 is increased and a relatively high powered light pulse is released. In addition, the workpiece need not be a tube-sheet; rather, the workpiece may be any suitable workpiece requiring engraved symbologie. Moreover, system 150 can be used to engrave materials other than "INCONEL" such as a variety of metallic materials (e.g., stainless steel) or non-metallic materials (e.g., plastic).

Therefore, what is provided is a system and method for engraving an image on a workpiece, such as a nuclear steam generator tubesheet.

What is claimed is:

1. A laser engraving system for engraving an image on a workpiece, comprising:
   (a) laser means for emitting a beam of light onto the workpiece;
   (b) fluid-cooled light pulsing means aligned with said laser means for receiving the beam of light emitted by said laser means and for converting the beam of light received thereby into a plurality of light pulses defining a pulsed beam of light;
   (c) positioning means connected to said laser means for positioning said laser means with reference to the workpiece;
   (d) control means connected to said positioning means for controlling said positioning means so that said laser means is controllably positioned thereby with reference to the workpiece; and
   (e) computer means connected to said control means for specifying when said laser means is positioned with reference to the workpiece and connected to said laser means for operating said laser means to engrave the image on the workpiece.

2. The laser engraving system of claim 1, wherein said control means comprises:
   (a) an electronic memory; and
   (b) verification means stored in said memory for verifying the image engraved by said laser means.

3. The laser engraving system of claim 2, further comprising vacuum means disposed adjacent the workpiece for vacuuming a plurality of particles from the workpiece.

4. A laser engraving system for engraving an image at a target position on a workpiece, comprising:
   (a) laser means for emitting a monochromatic beam of light onto the target position to engrave the image on the workpiece at the target position;
   (b) fluid-cooled light pulsing means aligned with said laser means for receiving the beam of light emitted by said laser means and for converting the beam of light received thereby into a plurality of light pulses defining a pulsed beam of light;
   (c) positioning means connected to said laser means for positioning said laser means at the target position;
   (d) control means connected to said positioning means for controlling said positioning means, so that said laser means is controllably positioned thereby at the target position; and
   (e) computer means connected to said control means for specifying when said laser means is positioned at the target position and connected to said laser means for operating said laser means, whereby said laser means is positioned at the target position as said control means controls said positioning means and whereby said laser means engraves the image at the target position as said computer means operates said laser means.

5. The laser engraving system of claim 4, wherein said control means comprises:
   (a) an electronic memory; and
   (b) verification means stored in said memory for verifying the image engraved at the target position.

6. The laser engraving system of claim 4, wherein said fluid-cooled light pulsing means is a fluid-cooled Q-switch.

7. The laser engraving system of claim 6, wherein said laser means further comprises a shutter aligned with said light pulsing means for selectively blocking and unblocking the pulsed beam of light emitted by said light pulsing means, said shutter adapted to close for blocking the pulsed beam of light and adapted to open for unblocking the pulsed beam of light.

8. The laser engraving system of claim 7, wherein said laser means further comprises a shutter activation switch connected to said shutter and adapted to engage the workpiece for opening said shutter to unblock the pulsed beam of light as said shutter activation switch engages the workpiece and adapted to disengage the workpiece for closing said shutter to block the pulsed beam of light as said shutter activation switch disengages the workpiece.

9. The laser engraving system of claim 7, wherein said laser means further comprises aperture means aligned with said shutter for providing a highest power density portion of the pulsed beam of light.

10. The laser engraving system of claim 9, wherein said laser means further comprises a collimator aligned with said aperture means for collimating the pulsed beam of light.

11. The laser engraving system of claim 10, further comprising vacuum means disposed adjacent the target position for vacuuming a plurality of particles from the target position, so that the engraved image is particle-free.

12. A laser engraving system for engraving an image at a plurality of predetermined target positions on a surface of a nuclear steam generator tubesheet, each target position defined by a predetermined X-coordinate and Y-coordinate associated therewith, the laser engraving system comprising:
   (a) a laser assembly for emitting a monochromatic beam of light onto each target position to engrave the tubesheet at each target position, said laser assembly including:
      (i) a housing having a hole for passage of a beam of light therethrough;
      (ii) a laser housed in said housing and adapted to emit the beam of light along a predetermined light path.
      (iii) a water-cooled Q-switch housed in said housing and coaxially aligned with said laser and adapted to be disposed in the light beam path for receiving the beam of light emitted by said laser and for converting the beam of light received thereby into a plurality of light pulses defining a pulsed beam of light traveling along a predetermined pulsed light beam path passing through the hole of said housing;

(iv) a shutter housed in said housing and coaxially aligned with said Q-switch and adapted to be disposed in the pulsed light beam path for selectively blocking and unblocking the pulsed beam of light, said shutter adapted to close for blocking the pulsed beam of light and adapted to open for unblocking the pulsed beam of light;

(v) an aperture housed in said housing and having a hole therethrough coaxially aligned with said shutter, the hole of said aperture disposed in the pulsed light beam path for providing a highest power density portion of the pulsed beam of light;

(vi) a collimator housed in said housing and coaxially aligned with said aperture, said collimator disposed in the pulsed light beam path for collimating the pulsed beam of light to compensate for divergence of the pulsed beam of light;

(vii) a shutter activation switch connected to said shutter and adapted to engage the tubesheet for opening said shutter to unblock the pulsed beam of light as said shutter activation switch engages the tubesheet and adapted to disengage the workpiece for closing said shutter to block the pulsed beam of light as said shutter activation switch disengages the workpiece;

(b) a positioning mechanism connected to said laser assembly for positioning said laser assembly at each target position, said positioning mechanism including:
  (i) a first carriage connected to said housing for moving said housing to the predetermined X-coordinate associated with a first one of the target positions;
  (ii) a second carriage connected to said housing for moving said housing to a predetermined Y-coordinate associated with the first one of the target positions;
  (iii) a first motor engaging said first carriage for operating said first carriage, so that said first carriage moves said housing to the X-coordinate associated with the first one of the target positions as said first motor operates;
  (iv) a second motor engaging said second carriage for operating said second carriage, so that said second carriage moves said housing to the Y-coordinate associated with the first one of the target positions as said second motor operates, said first motor and said second motor adapted to simultaneously operate for simultaneously operating said first carriage and said second carriage, so that said housing moves to the first one of the target positions along a straight vector beginning at a predetermined reference position and terminating at the first one of the target positions;

(c) a controller electrically connected to said first carriage and said second carriage for controllably operating said first carriage and said second carriage, so that said laser assembly is controllably positioned thereby at the first one of the target positions, said controller including:
  (i) an electronic memory; and
  (ii) verification means stored in said memory for verifying the image engraved at the target positions;

(d) a computer electrically connected to said controller for specifying when said laser is positioned with reference to the target positions and electrically connected to said laser for operating said laser, whereby said laser is sequentially positioned at each target position as said controller controls said positioning mechanism and whereby said laser emits the beam of light to engrave the image at each target position as said computer operates said laser;

(e) a laser head assembly connected to said housing, said laser head assembly comprising:
  (i) an enclosure connected to said housing, said enclosure having a first opening coaxially aligned with the hole in said housing for passage of the pulsed beam of light through the hole and through the first opening, said enclosure having a second opening for passage of the pulsed beam of light therethrough, the second opening being oriented parallel to the surface of the tubesheet;
  (ii) at least one beam deflector disposed in said enclosure for deflecting the pulsed beam of light passing through the first opening, so that the pulsed beam of light passing through the first opening is deflected to pass through the second opening along a deflected pulsed light beam path oriented normal to the surface of the tubesheet;
  (iii) an hydraulic cylinder attached to said enclosure, said cylinder including a post slidably engaging said cylinder, said cylinder adapted to selectively operate said post so that said post slidably outwardly extends toward the surface of the tubesheet and slidably inwardly retracts away from the tubesheet;
  (iv) a platform affixed to said post, so that said platform outwardly advances toward the surface of the tubesheet as said post outwardly extends and inwardly retreats away from the surface of the tubesheet as said post inwardly retracts, said platform having a hole aligned with the second opening of said enclosure for passage therethrough of the deflected beam of light traveling through the second opening; and
  (v) a shield attached to said platform for shielding the pulsed beam of light, said shield having a bore therethrough coaxially aligned with the hole of said platform for passage of the deflected pulsed beam of light through the bore, the bore being oriented perpendicularly with reference to the surface of the tubesheet so that the pulsed beam of light passes through the bore and is intercepted by the tubesheet, said shield having a channel therethrough in communication with the bore;

(f) a vacuum assembly connected to said shield for vacuuming a plurality of micro-particles from the tubesheet, said vacuum assembly including:
  (i) a vacuum hose having a first end and a second end, the first end of said hose in communication with the channel for conducting the particles through said hose and away from the tubesheet as a vacuum is applied to said hose;
  (ii) a canister in communication with the second end of said hose for receiving the particles vacuumed through said hose; and
  (iii) a vacuum source connected to said canister for applying a vacuum to said canister so that the particles are vacuumed into said canister.

13. An engraving apparatus for engraving an image on a nuclear steam generator tubesheet, comprising:

(a) a laser for emitting a beam of light onto the tubesheet to engrave the tubesheet;

(b) fluid-cooled light pulsing means associated with said laser for converting the beam of light into a plurality of light. pulses;

(c) a positioner connected to said laser for positioning said laser with reference to the tubesheet;

(d) a controller connected to said positioner for controlling said positioner; and (e) a computer connected to said controller and to said laser.

14. A laser engraving method for engraving an image on a workpiece, comprising the steps of:

(a) operating a positioning mechanism connected to a laser assembly for positioning the laser assembly adjacent the workpiece, the laser assembly connected to a computer;

(b) controlling the operation of the positioning mechanism by operating a controller connected to the positioning mechanism and to the computer;

(c) emitting the beam of light from the laser assembly by operating the computer connected to the laser assembly, so that the beam of light engraves the workpiece; and (d) converting the beam of light emitted by the laser into a plurality of light pulses by operating a fluid-cooled O-switch aligned with the laser, the Q-switch capable of receiving the beam of light and converting the beam of light into the pulsed beam of light.

15. The laser engraving method of claim 14, further comprising the step of storing a verification computer program in the controller for verifying the image engraved by the laser assembly.

16. The laser engraving method of claim 15, further comprising the step of vacuuming a plurality of particles from the workpiece as the laser assembly engraves the workpiece so that the engraved image is particle-free.

17. A laser engraving method for engraving an image at a target position on a surface of a nuclear steam generator tubesheet, the laser engraving method comprising the steps of:

(a) operating a positioning mechanism connected to a laser assembly for positioning the laser assembly adjacent the target position, the laser assembly including a laser electrically connected to a computer to operate the laser, the laser assembly adapted to emit a monochromatic beam of light;

(b) controlling the operation of the positioning mechanism by operating a controller electrically connected to the positioning mechanism, the controller being electrically connected to the computer;

(c) inputting an X-coordinate and a Y-coordinate into the controller to define the target position;

(d) communicating the target position to the computer by operating the controller electrically connected to the computer, the controller having an electronic memory;

(e) emitting the beam of light along a predetermined light path by operating the computer connected to the laser, so that the laser engraves the surface of the tubesheet at the target position; and (f) emitting a plurality of light pulses defining a pulsed beam of light along a predetermined pulsed light beam path by coaxially disposing a fluid-cooled Q-switch in the pulsed light beam path and by operating the Q-switch, so that the Q-switch receives the beam of light emitted by the laser and converts the beam of light into the plurality of light pulses.

18. The laser engraving method of claim 17, wherein said step of emitting the beam of light along the light path comprises the steps of:

(a) selectively blocking and unblocking the pulsed beam of light emitted by the Q-switch by coaxially disposing a shutter in the pulsed light beam path, the shutter being adapted to close for selectively blocking the pulsed beam of light and adapted to open for selectively unblocking the pulsed beam of light;

(b) providing a high power density pulsed beam of light as the pulsed beam of light is unblocked by the shutter by disposing an aperture coaxially in the pulsed light beam path;

(c) collimating the pulsed beam of light by coaxially disposing a collimator in the pulsed light beam path; and (d) deflecting the pulsed beam of light onto the target position by controllably operating a deflector disposed in the pulsed light beam path to engrave the image on the tubesheet at the target position.

19. The laser engraving method of claim 18, further comprising the step of storing a verification computer program in the memory of the controller for verifying the target position.

20. The laser engraving method of claim 19, further comprising the step of vacuuming a plurality of microparticles from the workpiece at the target position as the laser operates, so that the engraved image is particle-free.

* * * * *